UNITED STATES PATENT OFFICE.

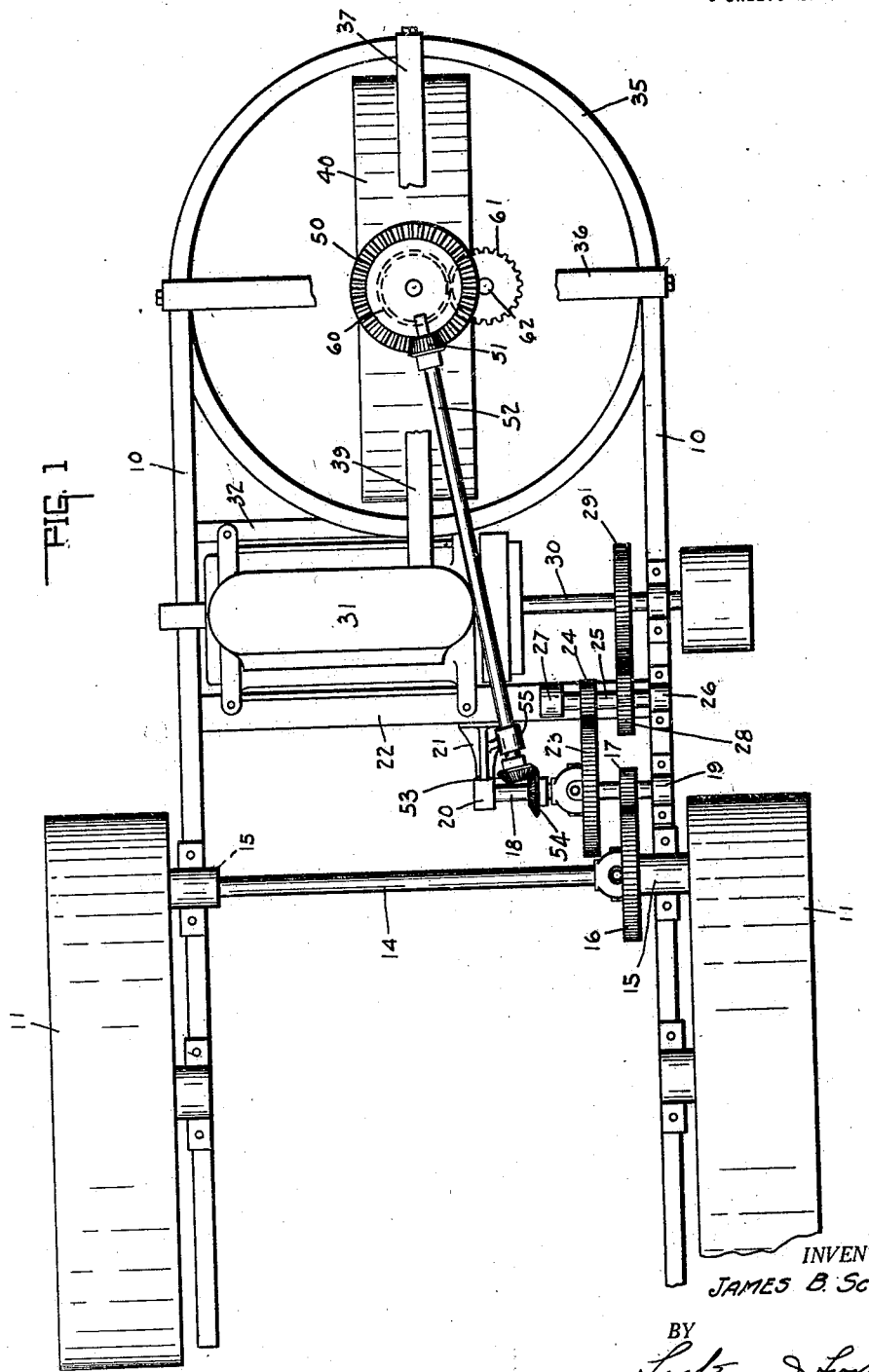

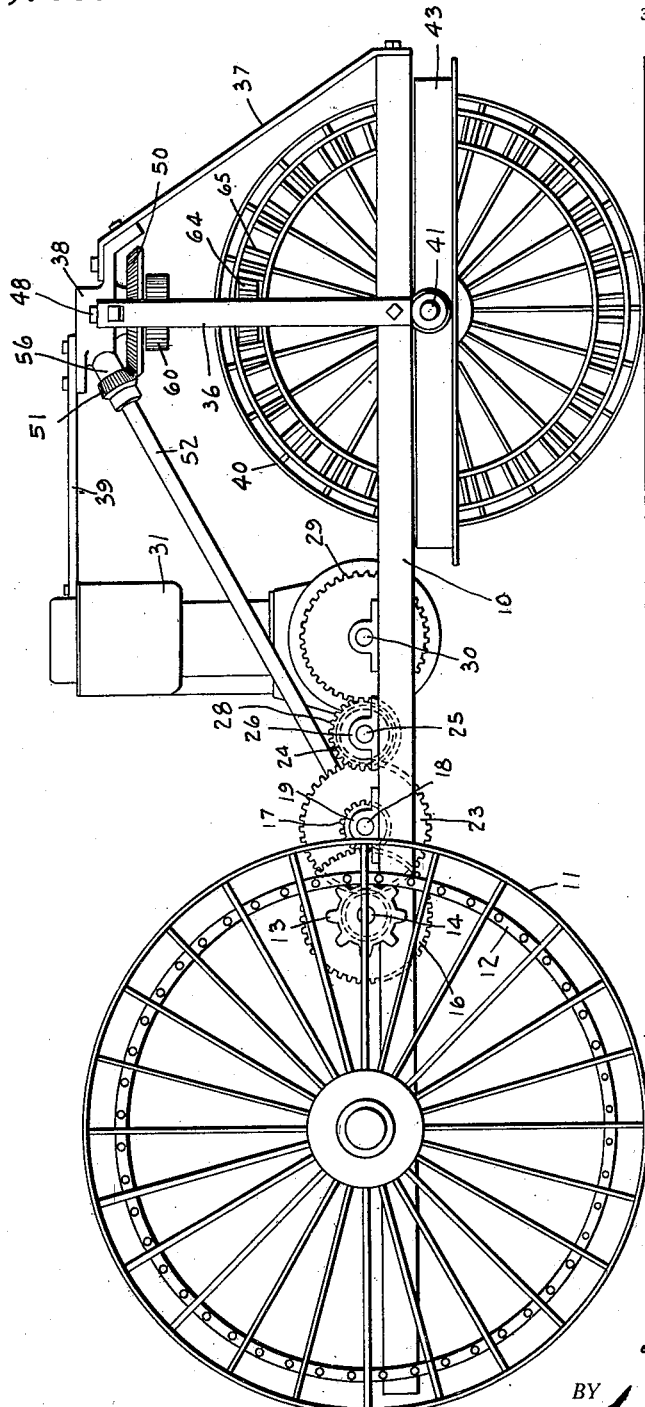

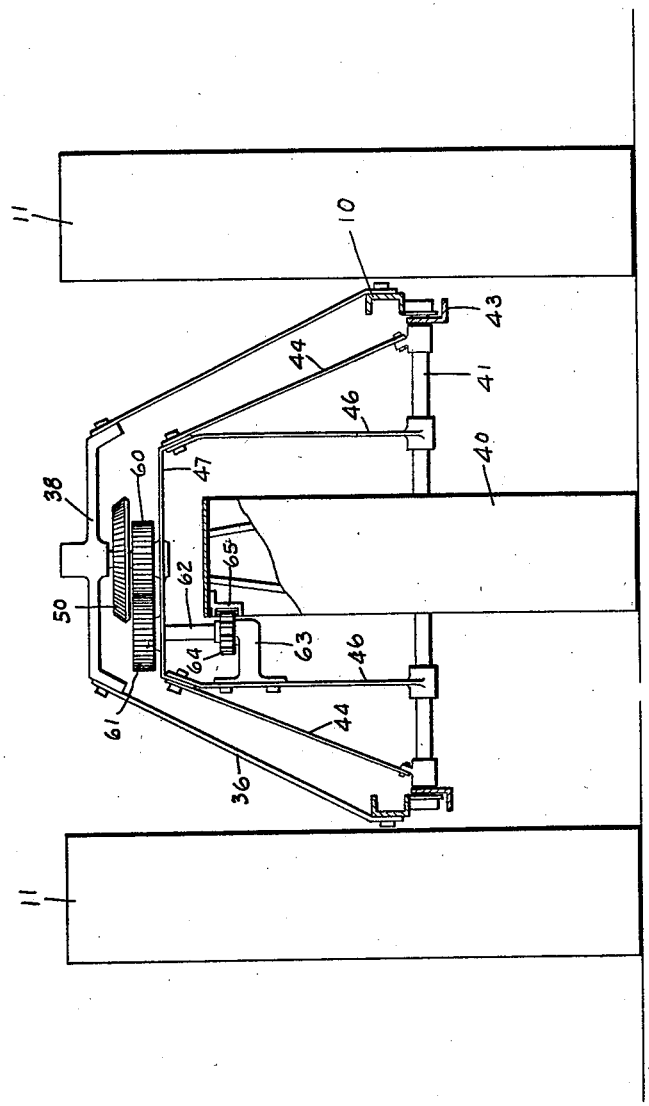

JAMES B. SCHUMAN, OF INDIANAPOLIS, INDIANA, ASSIGNOR TO THREE WHEEL DRIVE TRACTOR CO., A CORPORATION.

TRACTOR.

1,369,709.  Specification of Letters Patent.  Patented Feb. 22, 1921.

Application filed September 27, 1919. Serial No. 326,703.

*To all whom it may concern:*

Be it known that I, JAMES B. SCHUMAN, a citizen of the United States, and a resident of Indianapolis, county of Marion, and State of Indiana, have invented a certain new and useful Tractor; and I do hereby declare that the following is a full, clear, and exact description thereof, reference being had to the accompanying drawings, in which like numerals refer to like parts.

The object of this invention is to improve the construction and operation of the means of driving the steering wheel of a three-wheel tractor, so as to make said driving means very simply constructed and easily operated.

The full nature of this invention will be more fully understood from the accompanying drawings and the following description and claims.

In the drawings, which are made a part of this application, Figure 1 is a plan view of a tractor with parts thereof removed and parts broken away. Fig. 2 is a side elevation of the machine with parts omitted. Fig. 3 is a front elevation of the machine with parts in section and other parts omitted.

There is shown herein a frame 10 carried at the rear end by a pair of main propelling wheels 11, which are provided with internal gearing 12 driven by the pinion 13 secured on the shaft 14, which is mounted in the boxes 15 on the main frame. Said shaft is driven by a gear 16 meshing with the pinion 17 on the shaft 18, which is mounted at one end in the box 19 and at the other end in the bearing 20 on the frame 21 which extends from cross bar 22 forming a part of the main frame. The shaft 18 is driven by the gear 23 secured thereon which meshes with the pinion 24 on shaft 25 mounted in a box 26 at one end of the main frame and a box 27 mounted on the cross bar 22 of the main frame. The shaft 25 is driven by the gear 28 that meshes with gear 29 on the engine shaft 30 of the engine 31, which is mounted on the cross bar 22 and the bar 32 of the main frame.

A circular track 35 is secured to the forward end of the side bars 10 of the main frame. An A-shaped frame extends upwardly and from the circular track 35 connected with the main frame and consists of the side bars 36 and front bar 37, which at their upper ends are connected with a frame 38 which is also held in position by a bar 39 extending therefrom to the engine. The steering wheel 40 has an axle 41 extending therethrough, the ends of which are mounted in a circular frame 43. An A-shaped frame extends upward from said circular frame 43 and consists of outer side bars 44 and front bar 45 and inner side bars 46 and at their upper ends are connected with a turn table 47 having an upwardly extending spindle 48 that projects into the frame 38.

On said spindle 48 there is loosely mounted a bevel gear 50 which meshes with the bevel pinion 51 on the inclined shaft 52 which is driven by the engine through the mechanism heretofore described and the bevel gears 53 and 54. The shaft 52 is mounted in a bearing 55 at its lower end and a bearing 56 at its upper end. The former bearing is connected with the arm 21 of the main frame and the latter bearing is connected with the frame 38.

The bevel gear 50 drives a pinion 60 which is secured to it and that drives a pinion 61 mounted on the shaft 62 which extends through the turn table 47. The lower end of the shaft 62 is mounted in the bearing arm 63 secured to one of the inner A-shaped frame bars 46. A sprocket pinion 64 is secured on the shaft 62 in position to mesh with the sprocket gearing 65 on the side of the steering wheel.

The invention claimed is:

1. In an engine propelled tractor a main frame and a plate, a steering wheel, a frame in which said steering wheel is revolubly mounted, a vertical spindle on said steering wheel frame extending upwardly through said plate, an annular sprocket gearing on one side of the steering wheel and near the periphery thereof, a vertical shaft rotatably mounted in said steering wheel frame adjacent said spindle and sprocket gearing, a gear on one end of said shaft and in mesh with said sprocket gearing, a pair of meshing gears mounted upon said shaft and said spindle, said spindle supported gear being loosely mounted thereon, and gear means associated with said spindle mounted gear and driven by the engine.

2. In an engine propelled tractor a main frame and a plate, a steering wheel, a frame in which said steering wheel is revolubly mounted, a vertical spindle on said steering wheel frame extending upwardly through said plate, an annular sprocket gearing on one side of the steering wheel and near the periphery thereof, a vertical shaft rotatably mounted in said steering wheel frame adjacent said spindle and sprocket gearing, a gear on one end of said shaft and in mesh with said sprocket gearing, a pair of meshing gears mounted upon said shaft and said spindle, said spindle supported gear being loosely mounted thereon, a jack shaft driven by the engine, a beveled gear on said jack shaft, a beveled gear loosely mounted on said spindle and rigid with said spindle mounted gear, a shaft angularly positioned upon said main frame and beveled gears at each end of said angularly positioned shaft in mesh with the jack shaft mounted beveled gear and the spindle mounted beveled gear.

In witness whereof, I have hereunto affixed my signature.

JAMES B. SCHUMAN.